(12) United States Patent
Guittard et al.

(10) Patent No.: US 8,770,518 B2
(45) Date of Patent: Jul. 8, 2014

(54) CONNECTION OF A FUSELAGE TO AN AIRCRAFT WING

(75) Inventors: Dominique Guittard, Toulouse (FR);
Olivier Eve, Mondonville (FR);
Frédéric Fort, Saint Genies Bellevue (FR); Jérôme Colmagro, Toulouse (FR);
François Loyant, L'Isle Jourdain (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 13/428,291

(22) Filed: Mar. 23, 2012

(65) Prior Publication Data

US 2012/0286090 A1 Nov. 15, 2012

(30) Foreign Application Priority Data

Mar. 25, 2011 (FR) ...................................... 11 52493

(51) Int. Cl.
*B64C 1/26* (2006.01)
(52) U.S. Cl.
USPC ........................................ 244/120; 244/131
(58) Field of Classification Search
USPC ............... 244/117 R, 119, 120, 123.1, 123.7, 244/123.8, 13, 131
See application file for complete search history.

(56) References Cited

U.S. PATENT DOCUMENTS

| | | | | |
|---|---|---|---|---|
| 7,810,756 B2 * | 10/2010 | Alby et al. | ..................... | 244/119 |
| 2008/0156935 A1 * | 7/2008 | Alby et al. | ..................... | 244/119 |
| 2010/0170986 A1 * | 7/2010 | Lafly et al. | ..................... | 244/119 |
| 2010/0170987 A1 | 7/2010 | Meyer | | |
| 2011/0147521 A1 | 6/2011 | Delahaye et al. | | |

FOREIGN PATENT DOCUMENTS

| | | |
|---|---|---|
| DE | 323 283 C | 7/1920 |
| FR | 2 916 417 A1 | 11/2008 |
| FR | 2 936 489 A1 | 4/2010 |
| FR | 2 948 099 A1 | 1/2011 |
| WO | WO 2008041019 A1 * | 4/2008 |
| WO | WO 2008152248 A2 * | 12/2008 |

OTHER PUBLICATIONS

French Search Report issued Nov. 8, 2011 in Patent Application No. 1152493 with English Translation of Category of Cited Documents.

* cited by examiner

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

A wing box rib, joining an aircraft wing to the wing box and to the rest of the structure, extends advantageously over an adjacent part of the fuselage, having in particular an upper line situated above a junction line of the wing upper surface panel. The connection is simplified, as is the structure of the aircraft and its manufacture, a lightening is possible, and the transmission of stresses takes place in a more favorable manner.

4 Claims, 3 Drawing Sheets

CONNECTION OF A FUSELAGE TO AN AIRCRAFT WING

BACKGROUND OF THE INVENTION

1. Field of the Invention

The subject matter of the present invention is the area of connection of a fuselage to an aircraft wing.

2. Description of the Related Art

The conventional mode of connection comprises, as is represented in FIG. 1, a connection piece 1 of cruciform section at the junction of a panel of the fuselage 2, of a wing upper surface panel 3, of a wing box upper surface panel 4 extending the preceding panel, and of a rib 5 of the wing box extending the fuselage 2 while extending under it. Brackets 6 rest on the fuselage 2, and the upper surface panels 3 and 4 under the connection piece 1 to ensure a transmission of stress between the upper surface panels 3 and 4, being linked to said panels and also linked together through the rib 5 and the lower wing of the connection piece 1, with bolts 7. The rib 5 extends downwards up to a lower surface T-piece 8 through which it is connected to a wing lower surface panel 9 and a wing lower surface panel box 10. The assembly is completed by a lower surface backing plate that clamps the lower surface panels 9 and 10 together and the lower surface T-piece 8. Such connections appear in the prior documents FR-A-2 916 417 and FR-A-2 936 489.

FIG. 2 shows that the rib 5 has a contour that hugs the section of the wing and which is thus irregular. It is joined to the fuselage 2 by an upper junction line 12, curved and of variable height, extending typically over several adjacent panels 2a and 2b of the fuselage 2. It is further joined to a slanting frame panel 20 by a rear edge 21. The slanting frame panel 20 is joined to one of the panels 2b of the fuselage by an upper edge 22.

This design is complicated, and gives a connection quite long to manufacture, and which is in addition heavy. The aim of the invention is to propose a different connection, simplified with respect to the prior design.

BRIEF SUMMARY OF THE INVENTION

In a general manner, the invention relates to a connection of a fuselage to an aircraft wing, the wing comprising a rib extending the fuselage and a wing upper surface panel joined to the rib, characterised in that the rib extends above the wing upper surface panel and is joined to the fuselage at an upper line higher than a junction line from the wing upper surface panel to the rib.

The projecting rib enables an assembly to other fuselage panels over a contour simpler than that of the upper line 12 of FIG. 2. The junction of the rib to the fuselage is facilitated. The connection piece 1 with cruciform section disappears and the assembly is simplified.

The structure of the aircraft is not substantially weakened despite the omission of the connection piece 1 since the stresses of the wing remain transmitted to the rest of the aircraft by the wing box through the rib. The simplification of the assembly can, quite the opposite, lead to reinforcing it as regards the risks of rupture through fatigue or through corrosion of the assemblies.

An important advantage of the invention is that the upper line is advantageously horizontal and may thus be assembled very easily to the rest of the fuselage, especially if said upper line belongs to a junction line of two horizontal strips of panels of said fuselage. In an even better manner, the upper line can extend to a neutral bending line of the aircraft in a vertical plane, which considerably reduces the stresses.

The simplification of the structure of the aircraft is more extensive if the rib further encompasses a slanting frame panel.

A satisfactory fastening of the wing to the wing box is re-established if the wing upper surface panel and the wing box upper surface panel extending it are joined by brackets resting on the rib to an upper face and to a lower face of said upper surface panels, and assembled with bolts traversing the rib, thus replacing the link procured by the connection piece 1.

Such a connection is particularly advantageous with a fuselage made of composite material, since no panel then needs to be assembled to the connection piece 1 near the wing and wing box upper surface panels, where the stresses are important.

Another aspect of the invention is an aircraft provided with a connection according to the preceding description.

BRIEF DESCRIPTION OF THE SEVERAL VIEWS OF THE DRAWINGS

The invention will now be described in a purely illustrative manner with reference to the figures, among which.

DETAILED DESCRIPTION OF THE INVENTION

Figure 1:
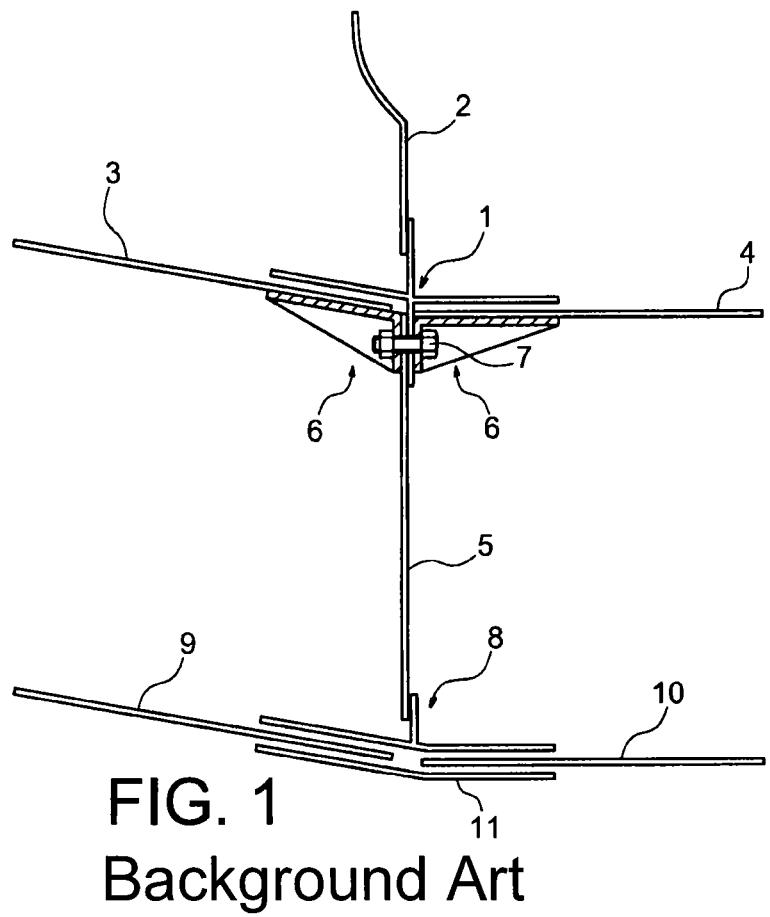
FIGS. 1 and 2, already described, represent a known connection of a fuselage to an aircraft wing, and the other
Figure 2:
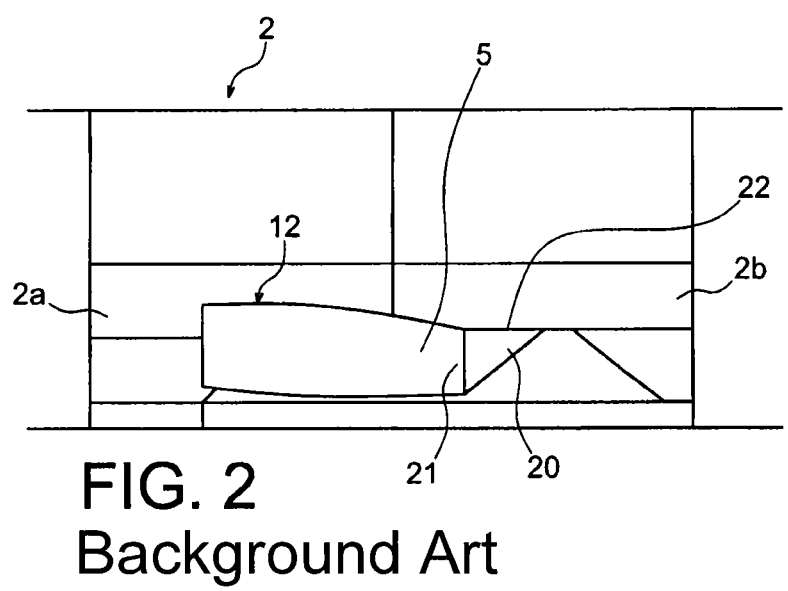
Figure 3:
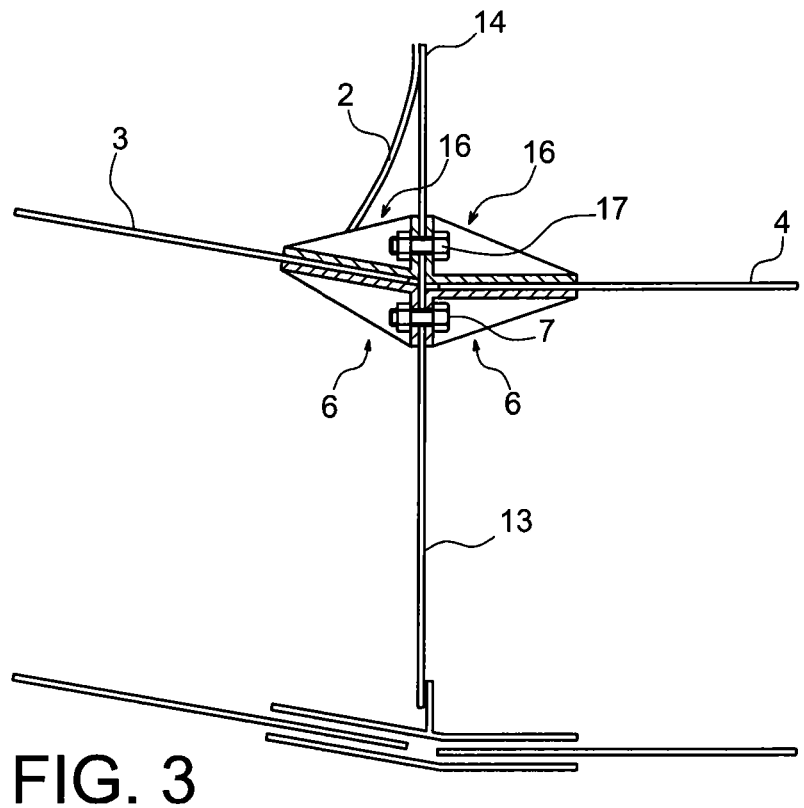
FIGS. 3, 4 and 5 illustrate an embodiment of the invention, FIG. 3 illustrating the connection, FIG. 4 the installation of the rib on the aircraft, and FIG. 5 the arrangement of the rib on the fuselage.
Figure 4:
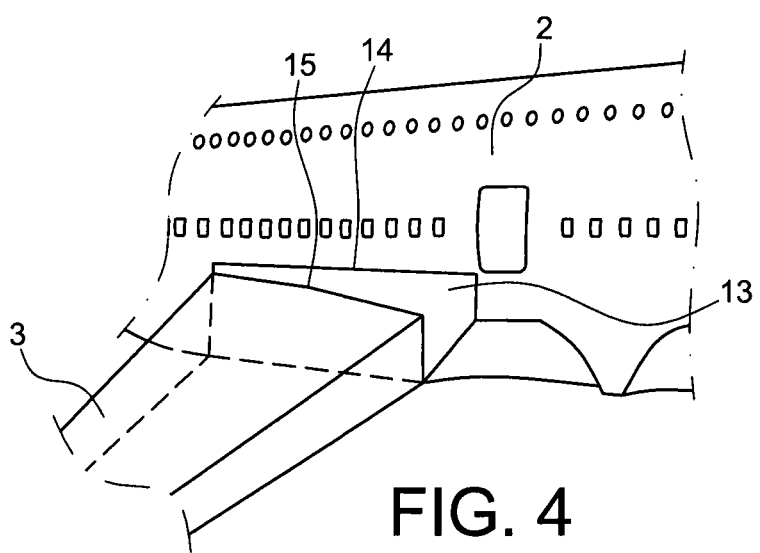
Figure 5:
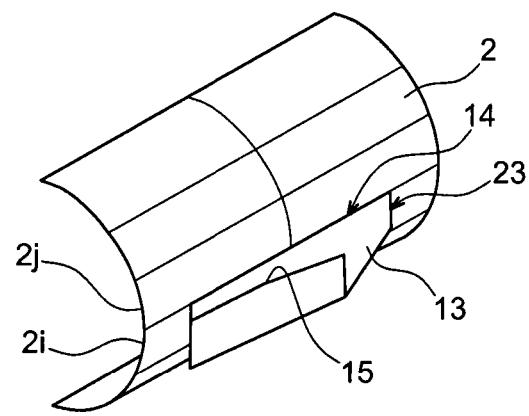

Reference is made to FIGS. 3 and 4. The rib according to the invention bears the reference (13) and henceforth has a greater extension than the section of the wing: its upper line (14) of junction to the fuselage (2) is above the junction line (15) to the upper surface panel (3 and 4). Said upper line is advantageously horizontal in order to be connected easily to the panels of the fuselage (2), and even more advantageously to the junction of two horizontal strips of said panels, strips denoted (2i and 2j) in FIG. 5, and, in an even more advantageous manner, at a height corresponding to the neutral bending line of the fuselage in a vertical plane, which thereby reduces the constraints exerted on the rib (13) and more particularly on the junction line.

The connection piece (1) is, as is represented in FIG. 3, replaced by two additional brackets (16) similar to the other brackets (6) but established on the upper faces of the upper surface panels (3 and 4), again with bolts (17) to link them together through the rib (13) making a transmission of stresses possible.

The rib (13) may also be extended towards the rear with respect to the known rib (5), henceforth encompassing the slanting frame panel (20); its rear edge (23) is then itself also connected to the fuselage (2). It is obvious that the integration of a part of the surface area of the fuselage in the rib (13), which is achieved in this invention, gives a more coherent connection, the fuselage panels being regular and the shape irregularities being all grouped together on the rib, which is in any case a part intended to absorb considerable stresses. The extension of the surface area of the rib also avoids that other parts of the aircraft, less resistant, are adjacent to the wing and to the stresses that pass through it. The manufacture of the aircraft itself must be simplified. The thermal stresses in the connection area, due to differential expansions, are considerably reduced or eliminated, as are problems linked to galvanic corrosion not just during routine use but also during assembly. These different advantages make it possible to construct more easily the fuselage made of composite material.

The invention claimed is:

1. A connection of a fuselage to an aircraft wing, the wing comprising a rib extending the fuselage and a wing upper surface panel joined to the rib,
   wherein the rib extends above the wing upper surface panel and is joined to the fuselage at an upper line higher than a junction line from the wing upper surface panel to the rib,
   wherein the upper line is horizontal, and
   wherein the upper line belongs to a junction line of two horizontal strips of panels of the fuselage.

2. The connection of a fuselage to an aircraft wing according to claim 1, wherein the upper line extends to a neutral bending line of the aircraft in a vertical plane.

3. An aircraft, comprising:
   a fuselage;
   a wing; and
   a connection of the fuselage to the wing, said wing comprising a rib extending the fuselage and a wing upper surface panel joined to the rib,
   wherein the rib extends above the wing upper surface panel and is joined to the fuselage at an upper line higher than a junction line from the wing upper surface panel to the rib,
   wherein the upper line is horizontal, and
   wherein the upper line belongs to a junction line of two horizontal strips of panels of the fuselage.

4. The aircraft according to claim 3, wherein the fuselage is made of composite material.

* * * * *